United States Patent [19]

Lindegger

[11] Patent Number: 5,007,505
[45] Date of Patent: Apr. 16, 1991

[54] ELEVATOR TRACTION SHEAVE BRAKE

[75] Inventor: Robert Lindegger, Scarborough, Canada

[73] Assignee: Northern Elevator Limited, Ontario, Canada

[21] Appl. No.: 495,138

[22] Filed: Mar. 19, 1990

[51] Int. Cl.⁵ ............................................... B66B 5/16
[52] U.S. Cl. ...................................... 187/89; 188/186
[58] Field of Search ................. 157/20, 38, 39, 89, 157/90, 86, 73, 88; 188/186, 184

[56] References Cited

U.S. PATENT DOCUMENTS 1,934,508  11/1933  McCormick ...................... 187/89
4,095,681   6/1978  David ............................... 187/89

FOREIGN PATENT DOCUMENTS 713811  2/1980  U.S.S.R. ............................. 187/89

Primary Examiner—H. Grant Skaggs
Assistant Examiner—Kenneth Noland
Attorney, Agent, or Firm—Wegner, Cantor, Mueller & Player

[57] ABSTRACT

An elevator traction sheave brake for use on a counterbalanced elevator. The brake comprises a controllable friction member which when released from its running position is compressed against the traction sheave and is capable of providing a braking torque in accordance with a preset braking profile whereby uncontrolled rotation of the traction sheave is prevented.

28 Claims, 6 Drawing Sheets

ELEVATOR TRACTION SHEAVE BRAKE

BACKGROUND OF THE INVENTION

1. Field of the Invention

The invention relates to an emergency elevator brake. In particular, this invention relates to a traction sheave brake which incorporates a friction member which is used to develop a braking torque when compressed against the traction sheave. The brake is intended to provide: (1) ascending car overspeed protection; (2) ascending car uncontrolled low speed protection; and (3) descending car uncontrolled low speed protection.

2. Background of the Invention

In conventional electrically powered elevator systems, an elevator car assembly is suspended within an elevator shaft. This assembly usually consists of an elevator car which is connected via a number of hoist ropes to a counter-balancing mass. The hoist ropes are mounted about one or more rotatable pulley-like members, where at least one such member is a traction sheave. Rotation of the traction sheave is controlled by electro-mechanical means. It is to be noted that a change in the vertical position of the elevator car caused by rotation of the traction sheave results in an equal but opposite change in the vertical position of the counter-balance. The mass of the counter-balance may vary. Commonly, the mass of the counter-balance is chosen to be approximately equal to the mass of the empty car plus the combined mass of the elevator passengers when the car is filled to half capacity.

Although conventional electrically powered elevator driving systems (machine, brake, motor, control etc.) as described are known to operate reliably some problems may be encountered. The failure of the driving system to operate in its intended manner may cause unwanted and uncontrolled rotation of the traction sheave and consequently elevator motion control may be lost.

In the absence of motion control due to the failure of the driving system to operate in its intended manner, the behaviour of the elevator system will be dictated by the operation of the gravitational forces acting on the counter-balance and the elevator car. Where the combined mass of the elevator car and the passengers is less than the mass of the counter-balance a loss in system control may cause the counter-balance to descend and the elevator car to ascend. Should this condition not be detected and rectified i.e. if there is no way to deal with this emergency, the counter-balance will continue to accelerate in the downward direction and the elevator car will continue to accelerate in the upward direction, with the possibility that the elevator car will crash into the overhead of the elevator shaft. This potentially dangerous condition is known as an "ascending car overspeed condition". The term "overspeed" refers to movement of the elevator car at a velocity greater than the rated speed of the elevator, also known as the "contract speed".

Uncontrolled low speed activity is also seen to occur. The term "low speed" is used to indicate elevator speeds on the order of the "leveling speed" which speeds are reached when the elevator is proximate to the landing area. The leveling speed is a fraction of the contract speed. It is assumed that the failure of the driving system to function in its intended manner will occur with the elevator at the door levelling zone or at floor level.

The direction of elevator car movement during uncontrolled low speed conditions will depend either on the direction of traction sheave motor operation or, upon lapsing of the driving system on the relative combined mass of the elevator car plus passengers as compared to the mass of the counter-balance. Where the mass of the counter-balance is greater than the combined mass of the elevator car plus passengers and the driving system is ineffective, the elevator car will rise slowly in an uncontrolled fashion. Where the combined mass of the elevator car plus passengers exceeds the mass of the counter-balance and the driving system fails to function in its intended manner, the elevator car will descend slowly in an uncontrolled fashion.

SUMMARY OF THE INVENTION

In one aspect, the present invention is an elevator traction sheave brake for use on a counter-balanced elevator which comprises a horizontally disposed supporting member mounted to a fixed carriage and located either above or below a traction sheave along the projection of a substantially vertical diameter of the traction sheave, adjacent a rim of the traction sheave and between elevator ropes. The supporting member is adapted to be moved in substantially vertical directions towards or away from the rim of the traction sheave. There is a horizontally disposed friction member in between the supporting member and the traction sheave which is mounted along side of the supporting member and to the fixed carriage. The friction member is adapted to be moved in substantially vertical directions either towards or away from the rim of the traction sheave in conjunction with the supporting member and is also adapted to be moved in substantially horizontal directions substantially parallel to the planes of the faces of the traction sheave independently of the supporting member. The friction member has braking means which utilize friction to produce a dynamic retarding torque and a static holding torque. There is at least one positioning member adapted to move both the supporting member and the friction member in a substantially vertical direction towards the rim of the traction sheave thereby bringing the braking means into contact with the traction sheave at a preset initial braking position such that further rotation of the traction sheave tends to draw the braking means from the initial braking position back towards the projection of the substantially vertical diameter of the traction sheave. There is at least one biasing member adapted to resist movement of the braking means away from the traction sheave following initial contact of the braking means with the traction sheave. Fixed means control the movement of the friction member in the substantially horizontal directions and provide a preset braking profile.

In yet another aspect, the present invention comprises an elevator having a traction sheave brake for use in a counter-balanced elevator. There is a horizontally disposed supporting member mounted to a fixed carriage and located either above or below a traction sheave along the projection of a substantially vertical diameter of the traction sheave, adjacent a rim of the traction sheave and between elevator ropes. The supporting member is adapted to be moved in substantially vertical directions towards or away from the rim of the traction sheave. A horizontally disposed friction member is located alongside the supporting member in between the supporting member and the traction sheave mounted to the fixed carriage. The friction member is adapted to be moved in substantially vertical directions either towards or away from the rim of the traction sheave in conjunction with the supporting member and is also adapted to be moved in substantially horizontal directions substantially parallel to the planes of the faces of the traction sheave independently of the supporting member. The friction member has a means for braking which utilize friction to produce a dynamic retarding torque and a static holding torque when compressed against the traction sheave. There is at least one positioning member adapted to move both the supporting member and the friction member in conjunction in a substantially vertical direction towards the rim of the traction sheave thereby bringing the braking means into contact with the traction sheave at a preset initial braking position so that further rotation of the traction sheave tends to draw the braking means back towards the projection of the substantially vertical diameter of the traction sheave. There is at least one biasing member adapted to resist movement of the braking means away from the traction sheave following initial contact of the braking means with the traction sheave. Fixed means control the movement of the friction member in the substantially horizontal directions and provides a preset braking profile.

On overhead machine arrangement the brake is disposed below the traction sheave. On basement machine arrangement the brake is disposed above the traction sheave.

Other objects, advantages and new features of the invention will become apparent from the following detailed description of the invention when considered in conjunction with the accompanying drawings.

DETAILED DESCRIPTION OF THE INVENTION

Figure 1:
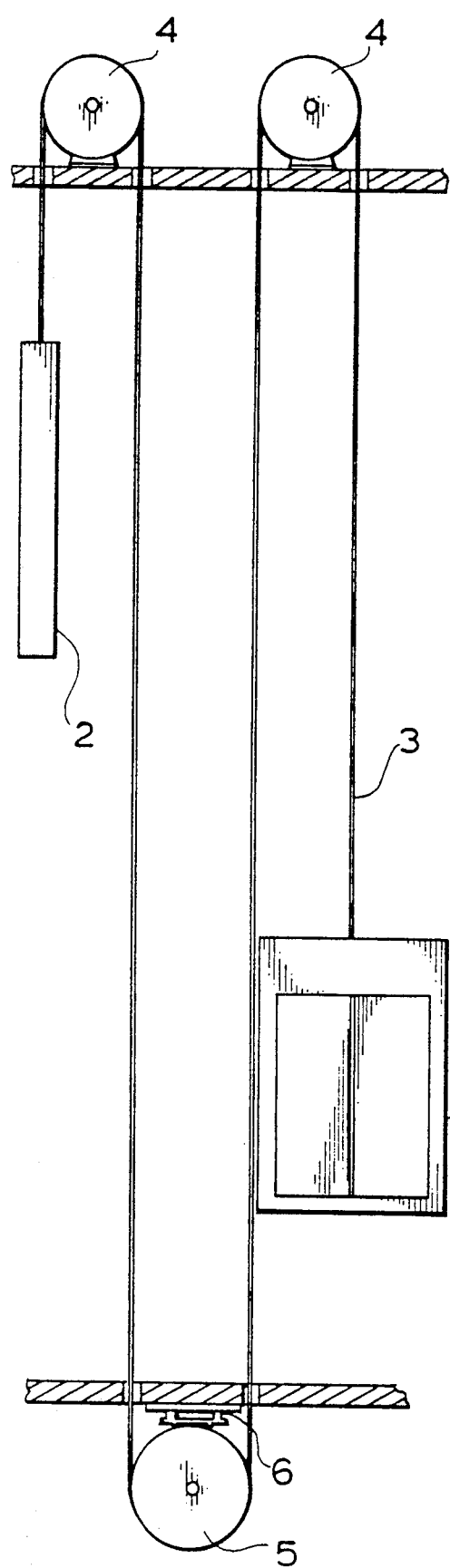
FIG. 1 is a schematic representation indicating the relative location of the various elevator system components in a conventional electrically powered elevator system with basement machine arrangement.

FIG. 1 shows an electrically powered elevator system with basement machine arrangement. This system includes an elevator car 1 which is connected to a counter-balance 2 via hoist ropes 3 which are mounted about pulleys 4 and traction sheave 5. The system includes an elevator traction sheave brake 6 according to the present invention. In this case as the machinery is located in the basement at the bottom of the elevator shaft, the brake 6 is disposed above the traction sheave 5.

Figure 2:
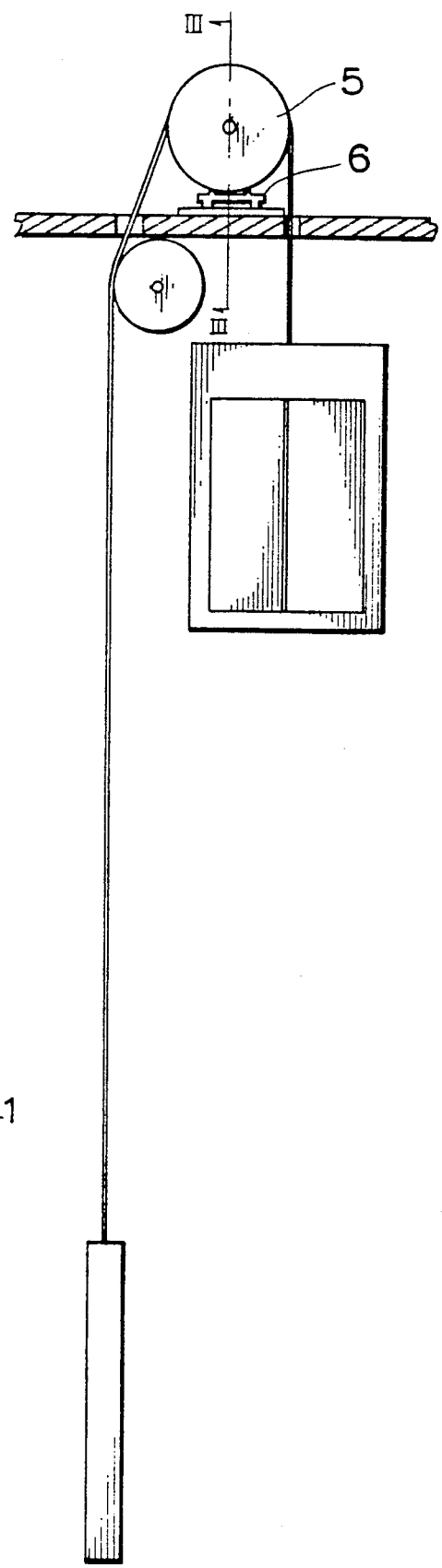
FIG. 2 is a schematic representation indicating the relative location of the various elevator system components in a conventional electrically powered elevator system with overhead machine arrangement.

FIG. 2 shows an electrically powered elevator system with overhead machine arrangement. In this case brake 6 is disposed below the traction sheave 5.

Figure 4:
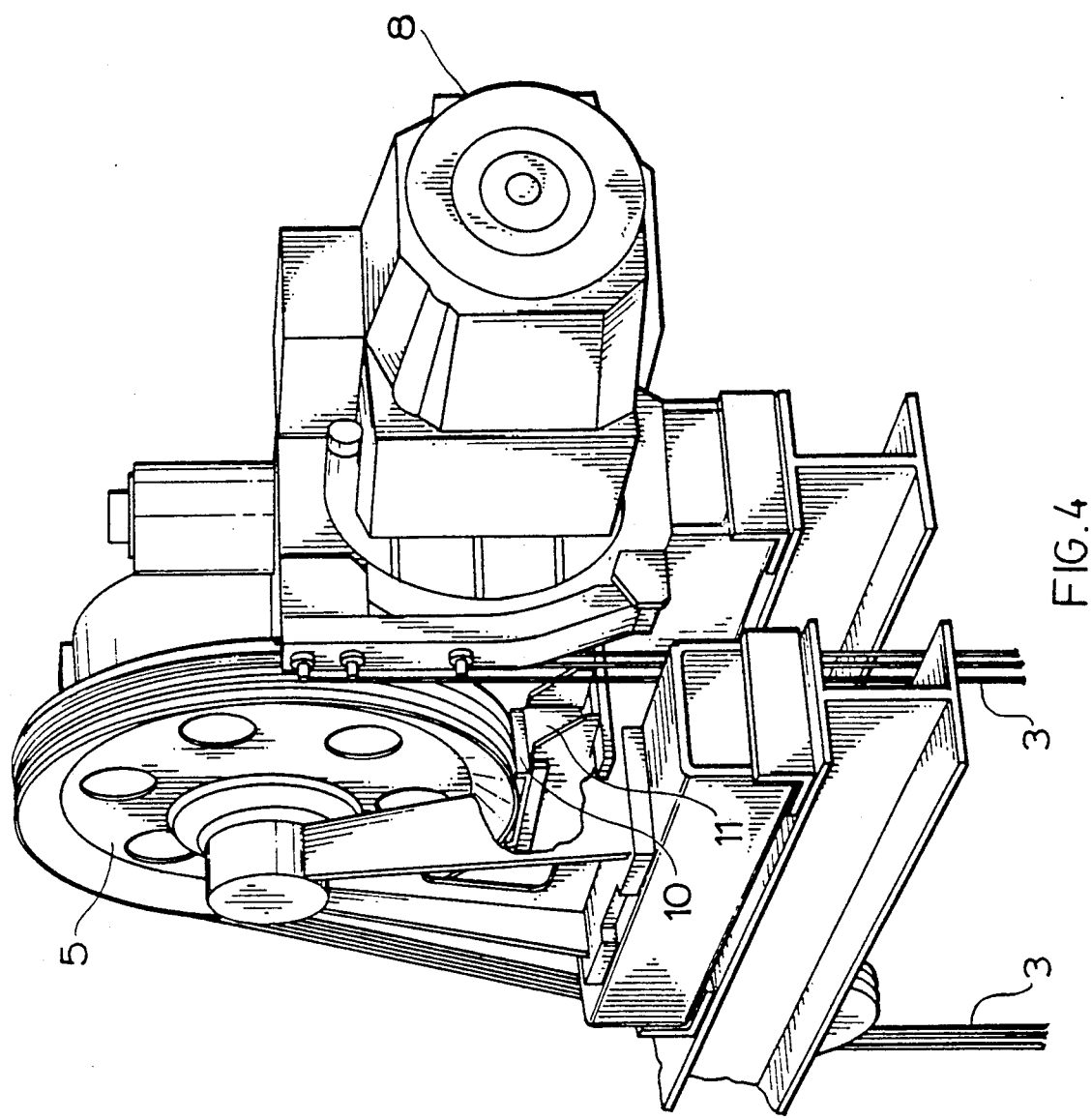
FIG. 4 is an isometric view of the machinery of FIG. 2.
Figure 3:
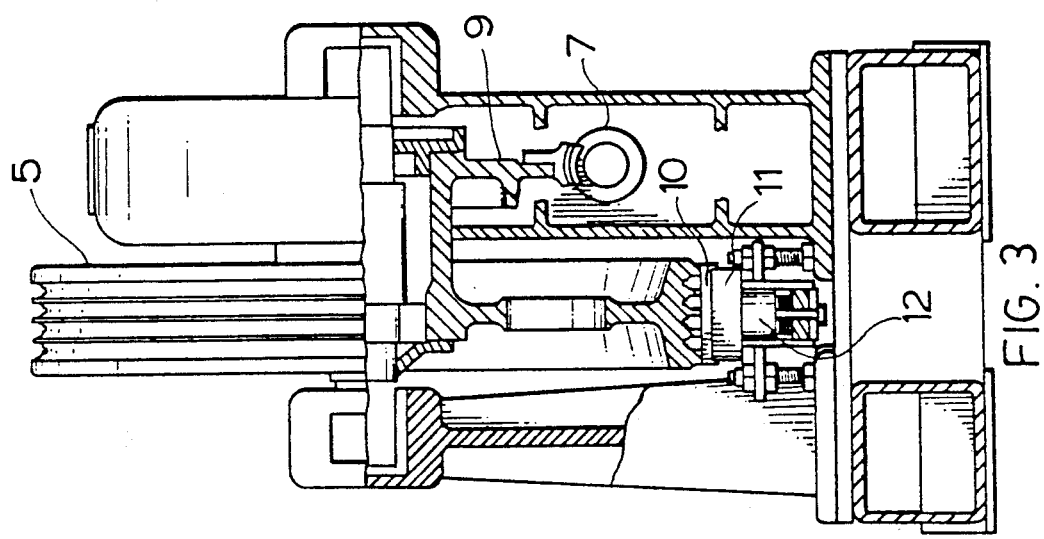
FIG. 3 is an end elevation of the machinery of FIG. 2 with partially cut away section on line III—III of FIG. 2.

Referring now to FIG. 3 shaft drive 7 connects motor 8 (see FIG. 4) to gear drive 9. The elevator traction sheave brake 6 is shown with a friction plate 10 which is shown overhanging a supporting main plate 11. The main plate 11 is disposed above a solenoid 12 which functions as a brake holding and releasing mechanism.

Figure 5:
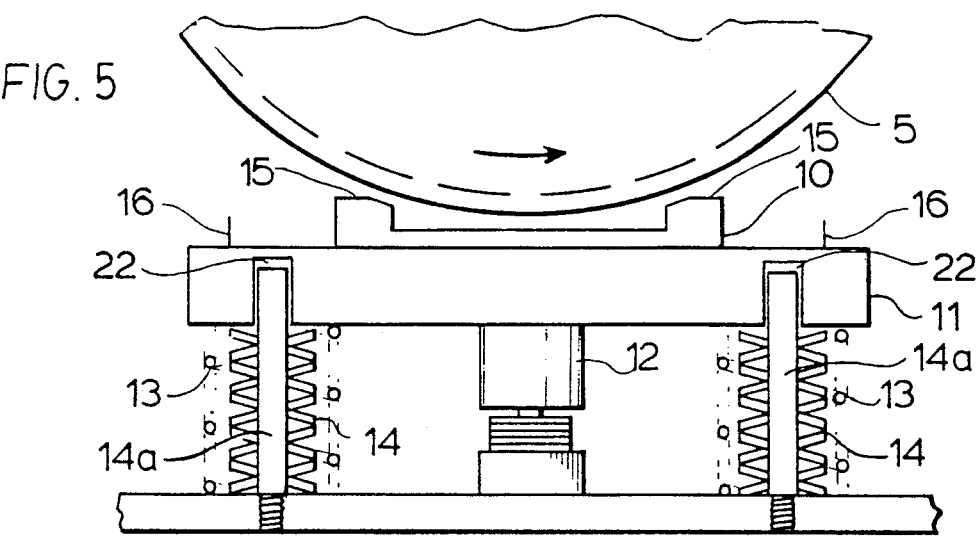
FIG. 5 is a schematic representation of the side view of the overhead machinery of FIG. 2 showing the elevator traction sheave brake in normal running position prior to brake release.

Referring now to FIG. 5 traction sheave 5 is shown rotating in the counter clockwise direction. As the solenoid 12 is in an energized state the main plate 11 is shown pulled away from the rim of the traction sheave by the electromagnetic force of the solenoid and is compressing the two symmetrically mounted helical springs 13. Two heavier duty disc springs 14 are unstressed when the brake is in the running position and are shown disposed co-axially within helical springs 13 about central guide pins 14a. Friction plate 10 is shown with a raised braking portion 15 at each end. The height of the braking portions 15 is designed to permit a defined running clearance between the braking portions and the rim of the traction sheave 5 prior to brake release.

Figure 6:
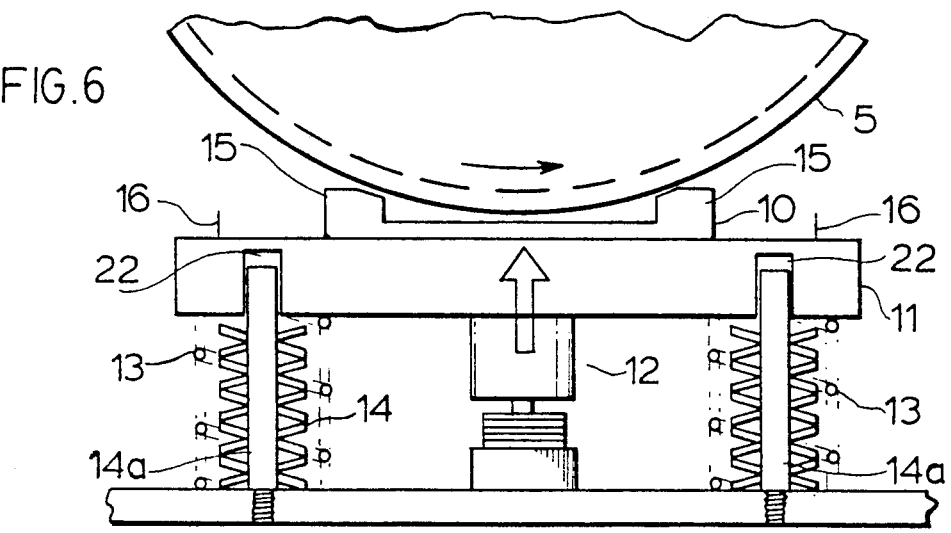
FIG. 6 is a schematic representation of the side view of the overhead machinery of FIG. 2 showing the elevator traction sheave brake at the time of brake release.

Referring now to FIG. 6 solenoid 12 is in a de-energized state and therefore the compressive force on helical springs 13 is released causing main plate 11 and friction plate 10 to be moved upwards in conjunction towards the rim of the traction sheave 5. The upward movement of the main and friction plates 11 and 10 continues until raised portions 15 come into contact with the rim of the traction sheave 5 at their respective preset initial braking positions (see FIG. 7). At the time of initial brake contact, helical springs 13 have been expanded to reach their maximum length.

The locations of the initial braking positions are chosen to ensure reliable brake performance. The locations depend on a variety of factors including: the geometry of the traction sheave; the traction sheave material; and the presence or absence of lubricants. In addition the locations of the initial braking positions will depend upon whether the brake is self-engaging and self-locking (i.e. the braking force is not supplemented by additional electro-mechanical means), or whether a supplementing means such as a servo-mechanical system is used.

The initial braking positions are each defined by means of engaging angles. The engaging angle is the angle between a radial line of the traction sheave in the direction of the initial preset braking position and a substantially vertical diameter line of the traction sheave. Experience has shown that where the brake is of the self-engaging and self-locking type, engaging angles between 9° and 12° are suitable for use with the actual sheave alloys currently used in the industry.

Figure 7:
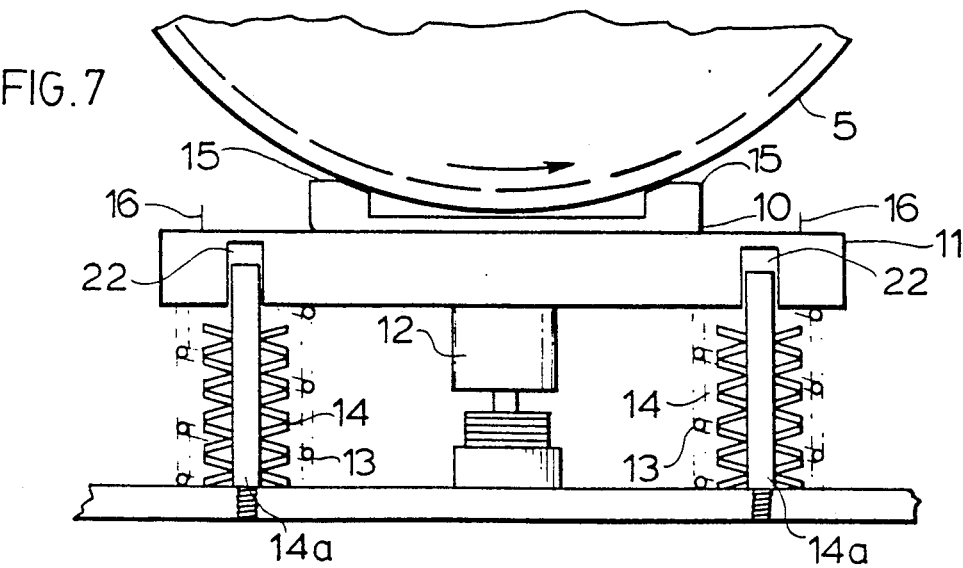
FIG. 7 is a schematic representation of the side view of the overhead machinery of FIG. 2 showing contact of the braking portions of the friction member with the traction sheave at their respective preset initial braking positions.
Figure 8:
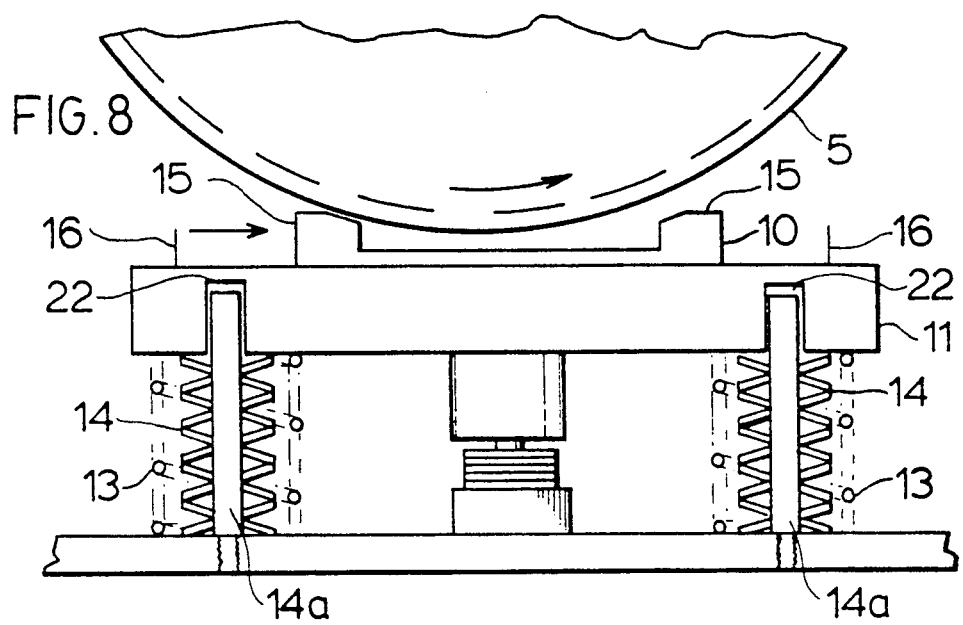
FIG. 8 is a schematic representation of the side view of the overhead machinery of FIG. 2 showing both displacement of the friction member caused by traction sheave rotation and contact between the underside of the supporting member and the biasing disc springs.

Referring now to FIG. 8 the assembly of FIGS. 5, 6, and 7 is shown where friction plate 10 has been moved both horizontally and downwardly under the influence of continued counter clockwise traction sheave rotation. The downward movement of friction plate 10 has caused a corresponding recompression of helical springs 13 via main plate 11. Downward movement of the main plate 11 has caused the underside of main plate 11 to make contact with disc springs 14. Further rotation of the traction sheave will cause the heavier duty disc springs 14 to resist further downward movement of the main plate 11 thereby providing a strong braking force. It is to be noted that the system is symmetric as clockwise rotation of the traction sheave will also trigger the braking force of the disc springs but movement of the friction plate will be in the opposite horizontal direction to the direction shown in FIG. 8.

It is apparent that during the time period between initial contact of the braking portions 15 with the traction sheave 5 at their respective preset initial braking positions and the time that the heavier duty disc springs 14 begin exerting an upward force under the influence of main plate 11, the braking force being applied to the traction sheave is solely via the helical springs 13 and is quite small. In actual operation, the time delay between initial brake release and disc spring activation is on the order of a fraction of a second and is therefore of negligible effect. Notwithstanding the resistance provided by the disc springs 14, continued horizontal movement of the friction plate 10 under influence of traction sheave rotation occurs until horizontal movement of the friction plate 10 is restrained by limiting means 16.

Figure 9:
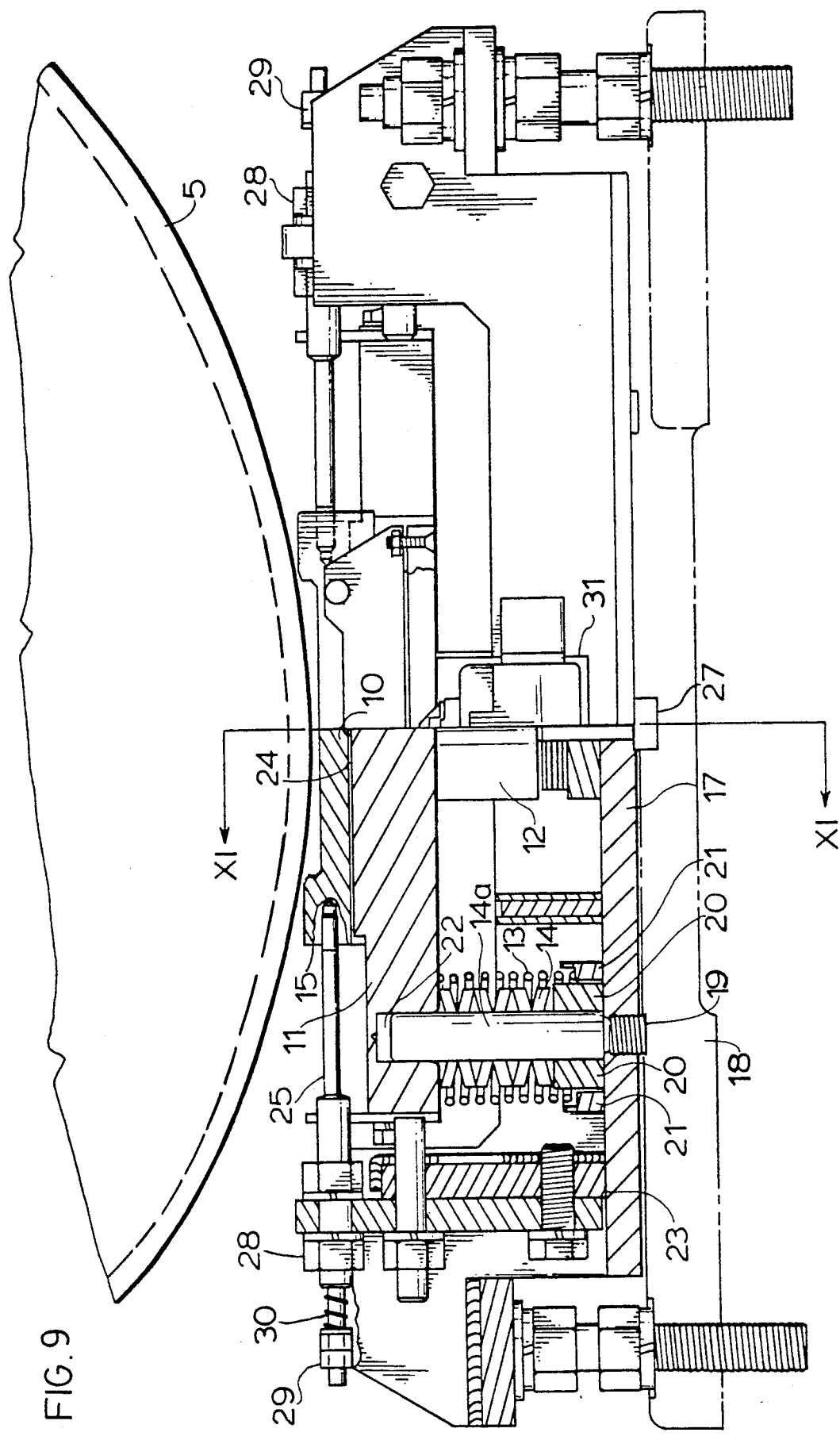
FIG. 9 is a side elevation partially in section on line IX—IX of FIG. 11 showing an embodiment of the present invention for use with overhead machinery.

Referring now to FIG. 9 support frame 17 is shown disposed above and adjacent traction sheave support member 18. The first of two guide pins 14a is shown disposed vertically and upwardly from an opening 19 in the support frame 17. Spacers 20 and 21 are inserted about guide pin 14a adjacent the top surface of support frame 17 with spacer 20 mounted co-axially within spacer 21. The first of two disc springs 14 and the first of two helical springs 13 are shown inserted over and about guide pin 14a resting upon spacers 20 and 21 respectively. Main plate 11 is horizontally disposed above the guide pins 14a with the top end of guide pins 14a mating with sockets 22 contained on the underside of main plate 11. The sockets 22 are of sufficient depth to allow the main plate 11 to be moved in the downward direction to compress helical springs 13 and disc springs 14. The horizontal movement of main plate 11 is restrained by vertically mounted side brackets 23 which in turn are fixed to the support frame 17. Friction plate 10 is mounted above and adjacent friction plate 11 with bearing surface 24 interposed between the top surface of the main plate 11 and the bottom surface of the friction plate 10 to assist movement of the friction plate in the horizontal directions. Horizontal movement of the friction plate 10 is guided by horizontally disposed pins 25 which are connected between the ends of friction plate 10 and side brackets 23. Solenoid 12 depends from the underside of main plate 11 and is contained within solenoid housing 26 (see FIG. 11) which is affixed to frame 17 via screw 27.

Figure 10:
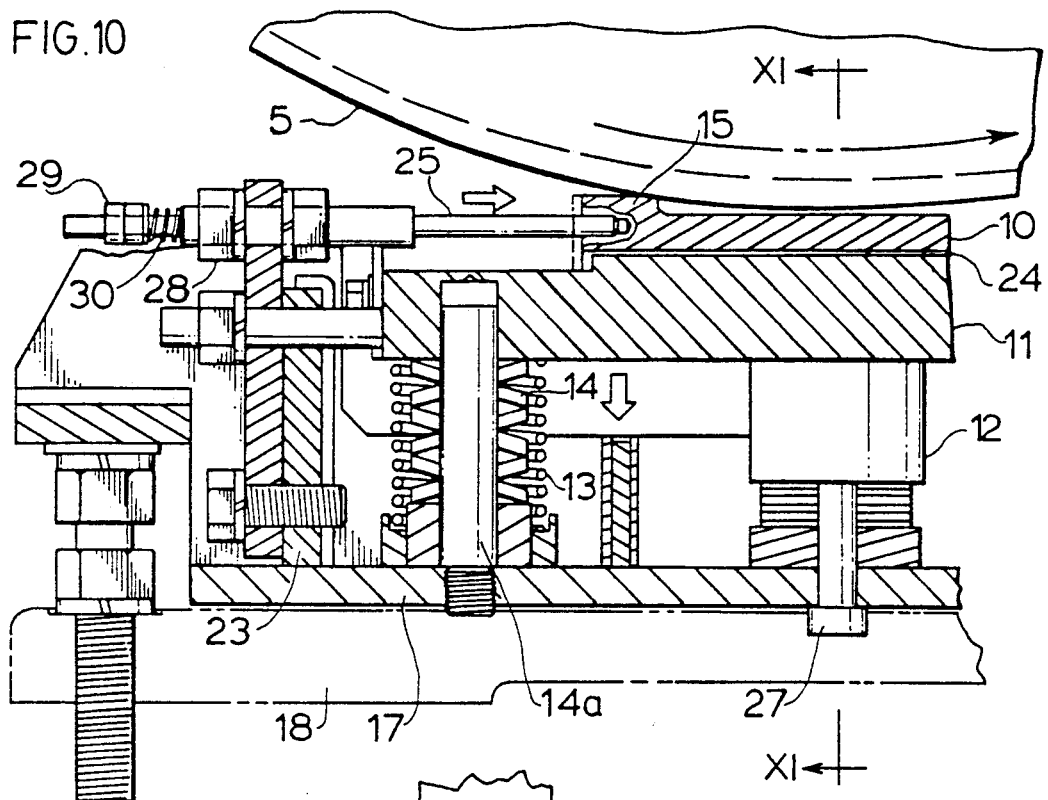
FIG. 10 is a side elevation showing operation of the brake as shown in FIG. 9 under the influence of counter clockwise rotation of the traction sheave.

As the brake is released, solenoid 12 has been de-energized thereby removing the downward electromagnetic force from main plate 11 causing helical springs 13 to become expanded thereby moving the main plate 11 and friction plate 10 in conjunction towards the rim of the traction sheave 5 and bringing braking means 15 into contact with the rim of the traction sheave 5. Continued rotation of the traction sheave has caused friction plate 10 to become horizontally displaced in the direction of traction sheave rotation. Continued contact of the braking means 15 with the rim of the traction sheave during braking will cause a corresponding downward force to be applied to helical springs 13 until the main plate begins to compress disc spring 14. (See FIG. 10).

The maximum vertical distance travelled by braking means 15 during brake operation (this distance being referred to as the "brake stroke"), is directly related to the compression undergone by the disc springs during brake operation. The brake stroke is related to the horizontal distance ("A") between the substantially vertical diameter of the traction sheave and the horizontal position of the initial braking position and the engagement angle ("B") by the approximate relationship:

Maximum stroke = $A \tan B$.

The trust bolts 28 provide the physical limitation to horizontal movement of the friction plate and are used for fine adjustment of the braking profile. Nuts 29 and springs 30 provide a mechanism to assist in repositioning the brake upon brake disengagement.

Figure 11:
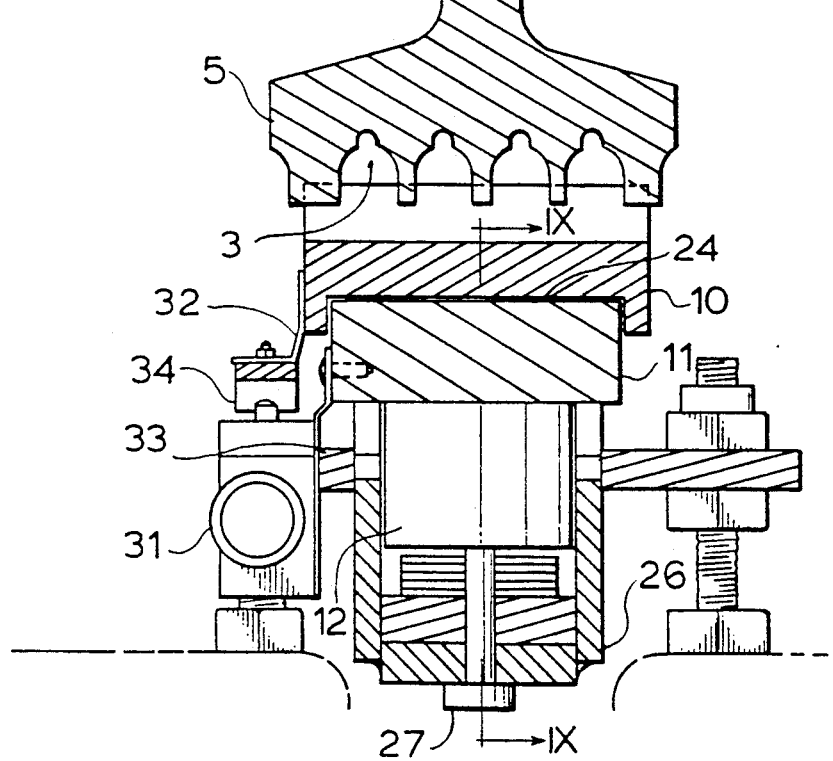
FIG. 11 is a section along line XI—XI of FIGS. 9 and 10.

Referring now to FIG. 11, precision switch 31 is shown attached to the friction plate 10 and the main plate 11 via brackets 32 and 33 respectively. Upon contact of the friction plate with the traction sheave 5 cam 34 is activated thereby activating precision switch 31 to ensure that the motor 8 does not function during brake operation.

From the foregoing it will be apparent that novel forms of elevator traction sheave brakes and elevators have been disclosed. While certain preferred embodiments of the invention have been shown and described it is to be understood that the invention is not limited thereto but may be otherwise variously embodied and practised within the scope of the following claims. In particular one may wish to introduce a time delay mechanism into the brake structure to prevent brake release during temporary short term power outages.

What is claimed is:

1. An elevator traction sheave brake for use on a counter-balanced elevator comprising:
   (a) a horizontally disposed supporting member mounted to a fixed carriage and located either above or below a traction sheave along the projection of a substantially vertical diameter of the traction sheave, adjacent a rim of the traction sheave and between hoist ropes, the supporting member being adapted to be moved in substantially vertical directions towards or away from the rim of the traction sheave;
   (b) a horizontally disposed friction member adjacent to the supporting member in between the supporting member and the traction sheave mounted to the fixed carriage, adapted to be moved in substantially vertical directions either towards or away from the rim of the traction sheave in conjunction with the supporting member and adapted to be moved in substantially horizontal directions substantially parallel to the planes of the faces of the traction sheave independently of the supporting member and having a means for braking which uses friction to produce a dynamic retarding torque and a static holding torque when compressed against the traction sheave;

(c) at least one positioning member adapted to move both the supporting member and the friction member in conjunction in a substantially vertical direction towards the rim of the traction sheave thereby bringing the braking means into contact with the traction sheave at a preset initial braking position so that further rotation of the traction sheave tends to draw the braking means back towards the projection of the substantially vertical diameter of the traction sheave;

(d) at least one biasing member adapted to resist movement of the braking means away from the traction sheave following initial contact of the braking means with the traction sheave; and (e) fixed means for controlling the movement of the friction member in the substantially horizontal directions to provide a preset braking profile.

2. The elevator traction sheave brake as claimed in claim 1 wherein the mass of the counter-balance exceeds the mass of the empty elevator car.

3. The elevator traction sheave brake as claimed in claim 2 wherein the brake provides ascending car overspeed protection in conditions where the combined mass of the elevator car and elevator passengers is less than the mass of the counter-balance.

4. The elevator traction sheave brake as claimed in claim 2 wherein the brake provides ascending car uncontrolled low speed protection upon failure of the driving system to operate in its intended manner and in conditions where the combined mass of the elevator car and passengers is less than the mass of the counter-balance.

5. The elevator traction sheave brake as claimed in claim 2 wherein the brake provides descending car uncontrolled low speed protection upon failure of the driving system to operate in its intended manner and in conditions where the combined mass of the elevator car and elevator passengers exceeds the mass of the counter-balance.

6. The elevator traction sheave brake as claimed in claim 2 wherein the brake provides: (1) ascending car overspeed protection in conditions where the combined mass of the elevator car and elevator passengers is less than the mass of the counter-balance; (2) ascending car uncontrolled low speed protection failure of the driving system to operate in its intended manner and in conditions where the combined mass of the elevator car and passengers is less than the mass of the counter-balance; and (3) descending car uncontrolled low speed protection upon failure of the driving system to operate in its intended manner and in conditions where the combined mass of the elevator car and elevator passengers exceeds the mass of the counter-balance.

7. The elevator traction sheave brake as claimed in claim 6 wherein there are means to facilitate movement of the friction member in the substantially horizontal directions.

8. The elevator traction sheave brake as claimed in claim 7 wherein the brake is self-engaging and self-locking and the engagement angle is substantially in the range of nine (9°) to twelve (12°) degrees.

9. The elevator traction sheave brake as claimed in claim 8 wherein the braking means forms a raised portion in the direction of the rim of the traction sheave.

10. The elevator traction sheave brake as claimed in claim 9 wherein there are two positioning members positioned symmetrically about the central vertical axis of the brake.

11. The elevator traction sheave brake as claimed in claim 10 wherein each positioning member is a solenoid activated helical spring which when the brake is in the runnimg position, is aligned in compressed form, in a substantially vertical direction and is adapted to be expanded in the direction of the rim of the traction sheave when the solenoid is de-energized.

12. The elevator traction sheave brake as claimed in claim 11 wherein there are two biasing members positioned symmetrically about the central vertical axis of the brake.

13. The elevator traction sheave brake as claimed in claim 12 wherein each biasing member is a disc type spring which when the brake is in the running position, is aligned in uncompressed form, in a substantially vertical direction.

14. The elevator traction sheave brake as claimed in claim 13 wherein the brake is disposed below the traction sheave and wherein the friction member overhangs the supporting member.

15. An elevator having a traction sheave brake for use on a counter-balanced elevator comprising:

(a) a horizontally disposed supporting member mounted to a fixed carriage and located either above or below a traction sheave along the projection of a substantially vertical diameter of the traction sheave, adjacent a rim of the traction sheave and between hoist ropes, the supporting member being adapted to be moved in substantially vertical directions towards or away from the rim of the traction sheave;

(b) a horizontally disposed friction member adjacent to the supporting member in between the supporting member and the traction sheave mounted to the fixed carriage, adapted to be moved in substantially vertical directions either towards or away from the rim of the traction sheave in conjunction with the supporting member and adapted to be moved in substantially horizontal directions substantially parallel to the planes of the faces of the traction sheave independently of the supporting member and having a means for braking which uses friction to produce a dynamic retarding torque and a static holding torque when compressed against the traction sheave;

(c) at least one positioning member adapted to move both the supporting member and the friction member in conjunction in a substantially vertical direction towards the rim of the traction sheave thereby bringing the braking means into contact with the traction sheave at a preset initial braking position so that further rotation of the traction sheave tends to draw the braking means back towards the projection of the substantially vertical diameter of the traction sheave;

(d) at least one biasing member adapted to resist movement of the braking means away from the traction sheave following initial contact of the braking means with the traction sheave; and (e) fixed means for controlling the movement of the friction member in the substantially horizontal directions to provide a preset braking profile 16. The elevator as claimed in claim 15 wherein the mass of the counter-balance exceeds the mass of the empty elevator car.

17. The elevator as claimed in claim 16 wherein the brake provides ascending car overspeed protection in conditions where the combined mass of the elevator car and elevator passengers is less than the mass of the counter-balance.

18. The elevator as claimed in claim 16 wherein the brake provides ascending car uncontrolled low speed protection upon failure of the driving system to operate in its intended manner and in conditions where the combined mass of the elevator car and passengers is less than the mass of the counter-balance.

19. The elevator as claimed in claim 16 wherein the brake provides descending car uncontrolled low sPeed protection uPon failure of the driving system to operate in its intended manner and in conditions where the combined mass of the elevator car and elevator passengers exceeds the mass of the counter-balance.

20. The elevator as claimed in claim 16 wherein the brake provides: (1) ascending car overspeed protection in conditions where the combined mass of the elevator car and elevator passengers is less than the mass of the counter-balance; (2) ascending car uncontrolled low speed protection upon failure of the driving system to operate in its intended manner and in conditions where the combined mass of the elevator car and passengers is less than the mass of the counter-balance; and (3) descending car uncontrolled low speed protection upon failure of the driving system to operate in its intended manner and in conditions where the combined mass of the elevator car and elevator passengers exceeds the mass of the counter-balance.

21. The elevator as claimed in claim 20 wherein there are means to facilitate movement of the friction member in the substantially horizontal directions.

22. The elevator as claimed in claim 21 wherein the brake is self-engaging and self-locking and the engagement angle is substantially in the range of nine (9°) to twelve (12°) degrees.

23. The elevator as claimed in claim 22 wherein the braking means forms a raised portion in the direction of the rim of the traction sheave.

24. The elevator as claimed in claim 23 wherein there are two positioning members positioned symmetrically about the central vertical axis of the brake.

25. The elevator as claimed in claim 24 wherein each positioning member is a solenoid activated helical spring which when the brake is in the running position, is aligned in compressed form, in a substantially vertical direction and is adapted to be expanded in the direction of the rim of the traction sheave when the solenoid is de-energized.

26. The elevator traction sheave brake as claimed in claim 25 wherein there are two biasing members positioned symmetrically about the central vertical axis of the brake.

27. The elevator as claimed in claim 26 wherein each biasing member is a disc type spring which when the brake is in the running position, is aligned in uncompressed form, in a substantially vertical direction.

28. The elevator as claimed in claim 27 wherein the brake is disposed below the traction sheave and wherein the friction member overhangs the supporting member.

* * * * *